(12) United States Patent
Won (10) Patent No.: US 7,035,544 B1
(45) Date of Patent: Apr. 25, 2006

(54) IDENTIFICATION OF RELATED COMMUNICATIONS CHANNELS IN A WAVELENGTH DIVISION MULTIPLEXED OPTICAL NETWORK

(75) Inventor: King L. Won, San Jose, CA (US)

(73) Assignee: McAfee, Inc., Santa Clara, CA (US)

(*) Notice: Subject to any disclaimer, the term of this patent is extended or adjusted under 35 U.S.C. 154(b) by 928 days.

(21) Appl. No.: 10/033,430

(22) Filed: Dec. 27, 2001

(51) Int. Cl.
*H04J 14/02* (2006.01)

(52) U.S. Cl. .............................. 398/79; 398/9; 398/11; 398/13; 398/14; 398/17; 398/25; 398/26; 398/27; 398/33; 398/34; 398/35; 398/38; 398/140; 398/141; 398/58; 398/59; 398/177; 398/82

(58) Field of Classification Search .................. 398/25, 398/26, 27, 33, 34, 35, 38, 79, 177, 140, 398/141, 58, 59, 82, 9, 11, 13, 14, 17
See application file for complete search history.

(56) References Cited

U.S. PATENT DOCUMENTS

| 5,130,836 | A | * | 7/1992 | Kaharu et al. ................. 398/33 |
| 5,572,515 | A | | 11/1996 | Williamson et al. |
| 5,986,782 | A | * | 11/1999 | Alexander et al. ............. 398/26 |
| 2002/0024692 | A1 | * | 2/2002 | Saito ............................ 359/110 |
| 2004/0202171 | A1 | * | 10/2004 | Hama ........................ 370/395.1 |

FOREIGN PATENT DOCUMENTS

| EP | 0911994 | 4/1999 |
| WO | WO 9967609 | 12/1999 |
| WO | WO 0025451 | 5/2000 |

OTHER PUBLICATIONS

HP Press Release, SuperComm '99: HP Launches Dedicated DWDM Test Solution, System Maximizes Throughput and Economy of Test for Network Equipment Manufacturers, Atlanta, Supercomm '99, Jun. 8, 3 pages.

Test & Measurement News Lightwave, Agilent Technologies Test & Measurement Online News & Events, Agilent SpectraBER testers handle 10-Gb/s, 2.5-Gb/s, 622-Mb/s, and 155-Mb/s rates, DWDM and SONET/SDH functional test to 10 Gb/s, Feb. 2000, Issue 60, 2 pages, http://www.tm.agilent.com/tmo/TMNews/English/17-0002.html.

Test & Measurement News Lightwave, Agilent Technologies Test & Measurement Online News & Events, Get complete, reliable test capability for DWDM system installation and maintenance, Characterize DWDM systems in the field, Nov. 1999, Issue 59, 2 pages, http://www.tm.agilent.com/tmo/TMNews/English/02-9911.htm.

(Continued)

*Primary Examiner*—Hanh Phan
(74) *Attorney, Agent, or Firm*—Zilka-Kotab, PC; Christopher J. Hamaty (57) ABSTRACT

Channels in an optical network that carry optical signals are evaluated using signal characteristics and suitable channels are compared to identify the channels that represent a single conversation using matching criteria. In another aspect, only channels that carry optical signals representing conversations of interest are compared.

29 Claims, 7 Drawing Sheets

OTHER PUBLICATIONS

Launching the Q8384 Optical Spectrum Analyzer For Evaluating Next Generation Optical Communications Systems And Components/With a 10pm Wavelength Resolution and 60dB Dymanic Range, Perfectly Suited for DWDM Optical Communications, Advantest Corporation Press Release, Jul. 7, 1999, 2 pages, http://www.www.advantest.co.jp/99-7-7-e.html.

DIGL Press Release, Digital Lightwave Introduces Industry's First Integrated Portable DWDM Analyzer, Digital Lightwave, Thursday, May 18, 2000, 2 pages, http://www.lightwave.com/newspress/051700rls.htm.

OSA-155 DWDM System Analyzer, Spectrum and WDM parameter analysis for applications on DWDM systems, Wavetech Wandel Goltermann, 1999, 5 pages http://fiberoptics.wwgsolutions.com/produccts/osa/osa155.html.

MN9320A Optical Channel Drop Unit, BER Testing 10 Gbps, 50GHz Spacing ±20 pm Accuracy, Independent Test Access Tool for Comprehensive DWDM Measurements, Anritsu, 8 pages.

* cited by examiner

IDENTIFICATION OF RELATED COMMUNICATIONS CHANNELS IN A WAVELENGTH DIVISION MULTIPLEXED OPTICAL NETWORK

FIELD OF THE INVENTION

This invention relates generally to wavelength division multiplexed optical networks, and more particularly to identifying related communication channels in such a network.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2001, Networks Associates Technology, Inc., All Rights Reserved.

BACKGROUND OF THE INVENTION

Typical methods of monitoring and analyzing single wavelength, single channel optical fiber links do not function with wavelength division multiplexed (WDM) optical networks since each WDM optical fiber can contain multiple channels, each on a different wavelength. Within each WDM optical fiber can be dense groupings of different channels, from as few as two or three up to several hundred. The different densities separate the different channels by wavelengths, called channel spacing. The closer the channel spacing, the more difficult and expensive it is to distinguish the channels in the fiber.

WDM optical networks are typically full duplex, either using two fibers carrying light waves in opposite directions, or a single fiber carrying light waves in both directions. For proper monitoring of WDM optical network, the fiber(s) must be separated into the individual channels so that the data inside the channels can be intercepted and analyzed. Additionally, the two channels corresponding to a single conversation may need to be identified because they generally are not carried on the same wavelength in both directions.

SUMMARY OF THE INVENTION

Channels in an optical network that carry optical signals are evaluated using signal characteristics and suitable channels are compared to identify the channels that represent a single conversation using matching criteria. In another aspect, only channels that carry optical signals representing conversations of interest are compared.

The present invention describes systems, clients, servers, methods, and machine-readable media of varying scope. In addition to the aspects of the present invention described in this summary, further aspects will become apparent by reference to the drawings and by reading the detailed description that follows.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

An overview of the flow of optical signals and control logic through an embodiment of the invention is described by reference to FIG. 1, in which a WDM (Wavelength Division Multiplexing) scanner 100 identifies matching channel pairs within two optical fibers. The operations of the WDM scanner 100 may be configured through input parameters 157, such as channel ranges, framing types, encoded formats, protocol markers, number of pairs (e.g., first, all, a particular subset) to detect, designated conversations, matching criteria, among other values, that are set by an outside user, application, network device, or other entity, represented in FIG. 1 as a network management device 155. It will be appreciated that the WDM scanner 100 can be set with default values that subsequently may be changed by the network management device 155 to tailor the scanner 100 to particular network situations. The network management device 155 may be a protocol analyzer, a network analyzer, a network monitor, or a security device, such as a firewall. The matched pairs are output to the management device 155 for subsequent monitoring and/or analysis, including intrusion detection, protocol troubleshooting, and traffic load monitoring. The control logic is distinguished from the optical signals by line width in FIG. 1, with the optical signals being represented by heavier lines.

Optical signals 101 from fiber A are fed into an optical tap 103 that diverts a portion of the signals for input into a tunable optical wavelength filter 105. The optical tap 103 may be an in-line optical splitter, an optical amplifier with an access port, or an optical regenerator, among other devices. An optical signal analyzer 109 instructs 115 the filter 105 to select a particular channel 107. If the optical signal in the selected channel 107 is of insufficient quality, such as having a signal-to-noise ratio that is too low, the analyzer 109 discards the channel and requests the next channel from the filter 105. Assuming the quality of the optical signal is acceptable, the analyzer 109 determines which, if any, of the characteristics of the channel it is configured to recognize. The configuration parameters of the analyzer 109 may be set by the network management device 155 and include characteristics such as speed, framing type, and encoding format.

The analyzer 109 records the results of its analysis of the channel in a data store 113, such as a database. When the analysis of the fiber A is complete, the scanner 100 similarly analyzes the channels in fiber B using optical tap 123, tunable optical wavelength filter 153, optical signal analyzer 129 and data store 133 as shown in FIG. 1. The operations of optical signal analyzers 109, 129 may be driven by the input parameters 157.

When the analysis of both fibers is complete, a matcher 141 retrieves 143, 145 the information from the data stores 113, 133 and determines which channels contain optical signals that are suitable based on the requirements of the network management device 155. For example, an unsuitable optical signal may have an unusable speed, may represent an unrecognizable framing type, or be encoded in a format that cannot be handled by the network management device 155. The matcher 141 instructs 147, 149 each filter 105, 125 to select a suitable channel 151, 153 from the fibers for evaluation. The matcher 141 determines if the two selected channels contain the data flows for a single "conversation" using various communication tags or markers within the optical signals as matching criteria. For example, TCP (transport communications protocol) transaction identifiers at the transport layer in the data flows could be used as matching criteria. The matching criteria may be configurable and is generally specified by the network management device 155 or other entity controlling the operation of the scanner 100. It will be appreciated that the markers may be at any of the protocol layers defined by the OSI (Open Systems Interconnection) network model up to, and including, the application layer.

If the selected channels match, the matcher records the match in the data stores 113, 133 and instructs 143, 149 filters 105, 125 to select new suitable channels for matching. If the selected channels do not match, the matcher 141 instructs 149 filter 125 to select another unmatched channel from fiber B. If no channels in fiber B match the selected channel in fiber A, the matcher 141 instructs 147 filter 105 to select another channel in fiber A and attempts to the match unmatched channels in fiber B against the newly selected channel in fiber A When all channels in fiber A have been evaluated by the matcher 141, the scanner 100 terminates the current session. The matching pairs 159 may be output as they are found or may all be output at one time when the current session terminates. Additionally, the scanner 100 may output information from the data stores 113, 133 about the matching pairs 159 or about the channels in general. Furthermore, one of skill in the art will readily understand that the matching pairs 159 may undergo additional processing before being output to the network management device 155, such as wavelength or protocol conversion, or a change in signal type, e.g., optical to electrical.

Figure 1:
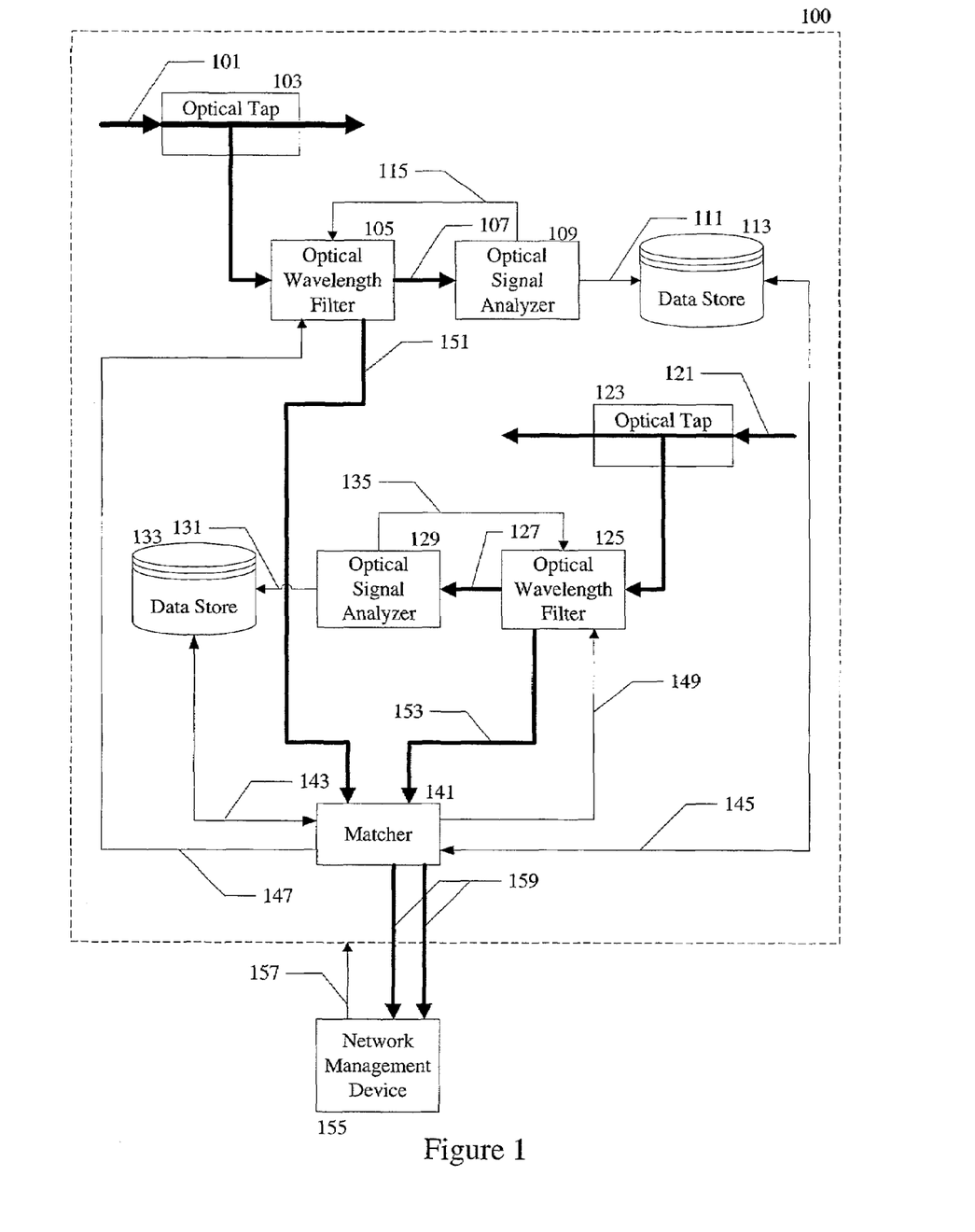
FIG. 1 is a diagram illustrating the operations of an embodiment of the invention.

For the sake of clarity in illustration, FIG. 1 shows the operations for matching only two fibers but the invention is not so limited and one of skill in the art will recognize that the invention can be expanded to match channels in any number of fibers. Furthermore, it will be appreciated that the scanner 100 may analyze the fibers in parallel. Selection of the first fiber ("fiber A") to process may be random, determined by input parameters 157, or based on other criteria.

In an alternate embodiment, the network management device 155 designates only certain conversations as of interest and suitable channels containing data flows for other conversations are ignored by the matcher 141. The detection of the channels containing data flows of such designated conversations is made by matcher 141 based on the type of analysis to be subsequently performed on the matching pairs. For example, if a particular protocol is to be analyzed, the matcher 141 uses protocol information recorded in the data stores 113, 133 to determine which channels to select for evaluation.

While the WDM scanner 100 has been described as a discrete system, one of skill in the art will immediately understand that the operations of the WDM scanner 100 may be incorporated into the network management device 155. Furthermore, although a particular arrangement of components for the WDM scanner 100 are shown in FIG. 1, one of skill will immediately recognize that the operations may be embodied in different arrangements of components without departing from the scope of the invention. For example, it will be appreciated that the analyzers 109, 129 may be the same optical signal analyzer. Furthermore, the optical signal analyzer(s) also may be co-located with the matcher 141. Alternatively, the filters that select channels for the analyzers 109, 129 may be different components than the filters that select channels for the matcher 141.

Figure 2A:
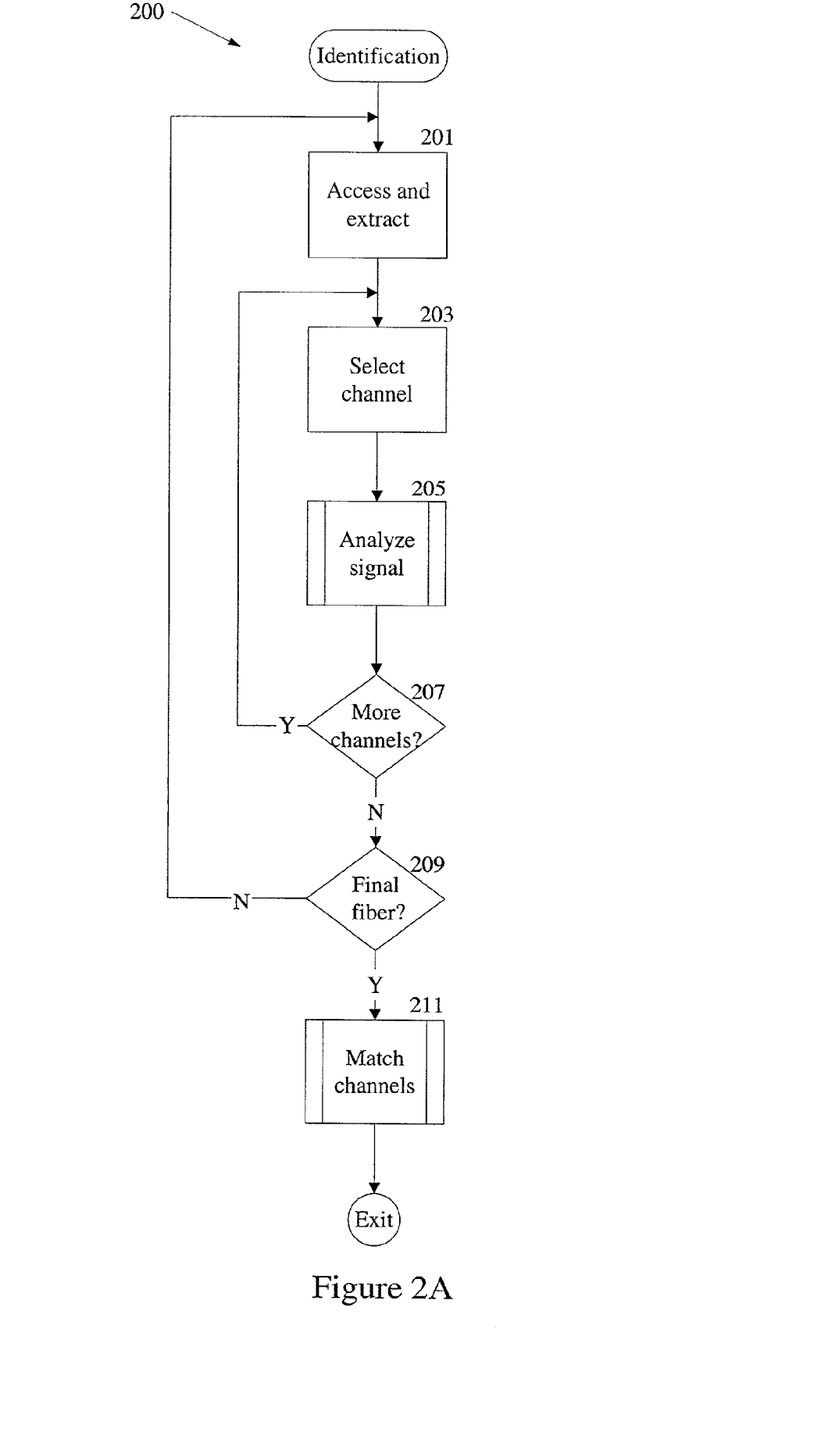
FIGS. 2A–D are flowcharts of methods that perform the operations of the embodiment of the invention shown in FIG. 1.

Next, one embodiment of an identification method 200 that performs the operations described above in conjunction with FIG. 1 is illustrated in FIG. 2A. The method 200 accesses a fiber, extracts the channel signals (block 201), and selects a channel with acceptable quality (block 203). The method 200 analyzes the selected channel and records the characteristics of the optical signal in the channel in the database (block 205) as described in more detail in conjunction with FIG. 2B. If there are more channels in the current fiber (block 207), the method 200 returns to block 203 to select another channel for analysis. If all channels in the current fiber have been evaluated, and the current fiber is the not the final fiber to be analyzed (block 209), the method 200 returns to block 201 to access the next fiber.

Figure 2B:
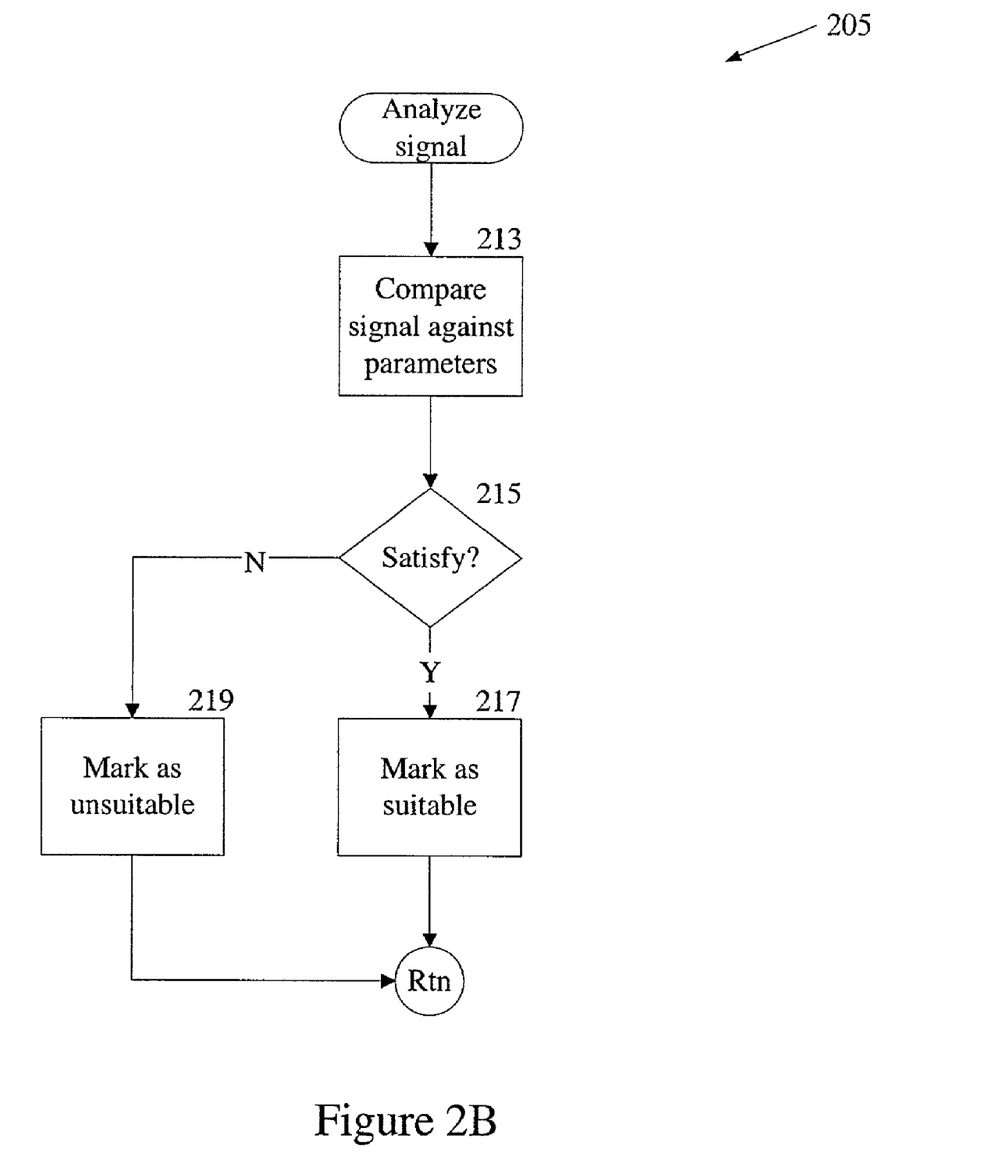
Figure 2C:
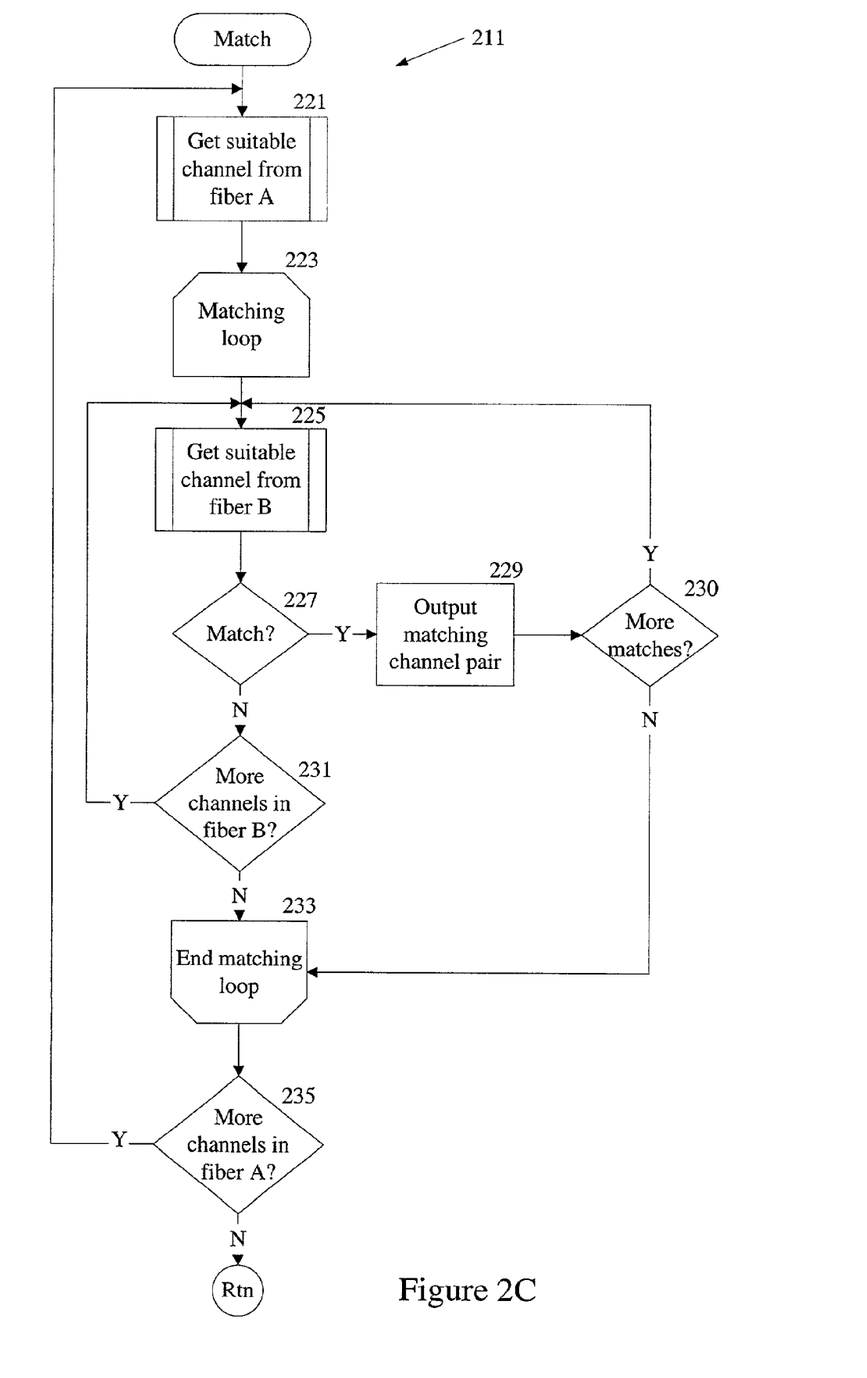
Figure 2D:
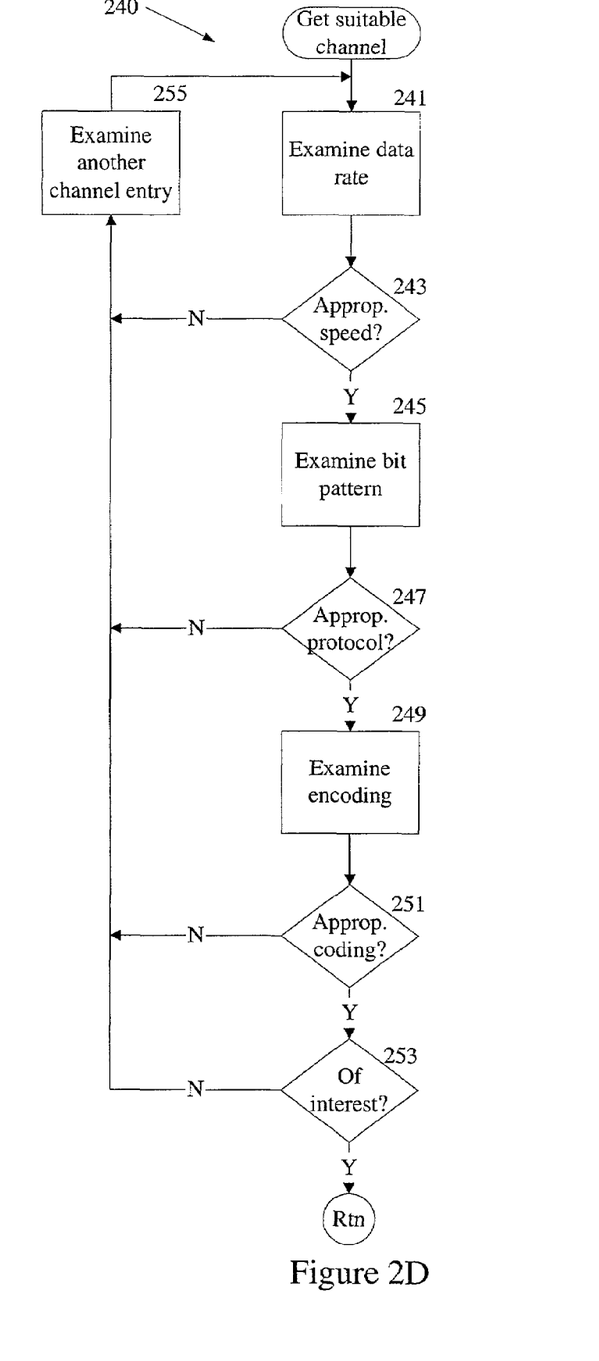

When the method 200 has processed all the channels in the fibers through the operations represented by blocks 201 until block 207, the method 200 performs a matching operation (block 211) as described in more detail in conjunction with FIGS. 2C–D to determine the channel pairs that will be sent to the subsequent monitoring and/or analysis process. In an alternate embodiment not shown, the matching operation at block 211 may operate in parallel with the operations in blocks 201 through 209 to evaluate channels that already have been analyzed.

The methods described next in conjunction with FIGS. 2B–D may constitute computer programs made up of machine-executable instructions. Describing the methods by reference to a flowchart enables one skilled in the art to develop such programs including such instructions to carry out the methods on suitably configured computers (the processor of the computer executing the instructions from computer-readable media), such as described in conjunction with FIG. 3B further below. The instructions may also execute on individual processors or controllers implemented as either stand-alone machines or integrated into other components or devices, such as a network management device.

The machine-executable instructions may be written in a computer programming language or may be embodied in firmware logic. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a processor causes the processor to perform an action or to produce a result.

Beginning with FIG. 2B, an "analyze signal" method 205 determines if the characteristics of the optical signal in a channel are recognizable by comparing the signal against its configuration parameters (block 213). As described previously, the configuration parameters may be specified by the subsequent monitoring and/or analysis process. If the signal satisfies the parameters (block 215), the channel is marked as suitable in the data store (block 217); otherwise, it is marked as unsuitable (block 219). The characteristics, or the fact that they cannot be recognized, also may be written to the data base at blocks 217, 219.

Turning now to FIG. 2C, a match method 211 obtains information about a suitable channel from fiber A (block 221) and performs a matching loop (represented by blocks 223 until 233) on the optical signal in the channel. Information about a suitable channel from fiber B is obtained (block 225) and matching criteria is used to determine if the optical signals in the channels form a single conversation (block 227). If so, the matching channel pair is output, or recorded for subsequent output, to the subsequent monitoring and/or analysis process (block 229). If additional possible matches for the channel in fiber A are desired (block 230), the method 211 returns to block 225 to search for another matching channel in fiber B; otherwise the matching loop ends at block 233. If there are still unmatched channels in fiber A (block 235), the method 211 obtains another suitable channel from fiber A at block 221 and repeats the matching loop.

If there is no match at block 227 and there are unmatched channels in fiber B (block 231), another channel from fiber B is obtained at block 225 and evaluated at block 227. If there are no more unmatched channels in fiber B, the matching loop ends. If all channels in fiber A have been evaluated (block 235), the matching method 211 returns to the identification method 200.

Details of one embodiment of the process represented at blocks 221 and 225 are illustrated in FIG. 2D as a "get suitable channel" method 240. The method 240 examines the data rate (block 241), the bit pattern (block 245), and the encoding (block 249) recorded in the database for the optical signal in each channel (repeating at block 255) until it finds a channel having characteristics appropriate for the subsequent monitoring and/or analysis process (blocks 243, 247, 251). The method 240 also can determine if the optical signal contains a conversation designed as "of interest" by the network management device (block 253). If the optical signal meets the specified characteristics, the channel information is returned to the match method 211.

It will be appreciated that the acts described in conjunction with FIGS. 2A–D are not required to be performed in the particular order shown and that the processes of the invention may be divided into more or fewer logical blocks than those shown. For example, alternate embodiments of the method 240 may evaluate more or fewer, or different, characteristics than illustrated without departing from the scope of the invention. Furthermore, other operations in FIG. 2A may be implemented as machine-executable instructions although not illustrated as such herein.

Figure 3A:
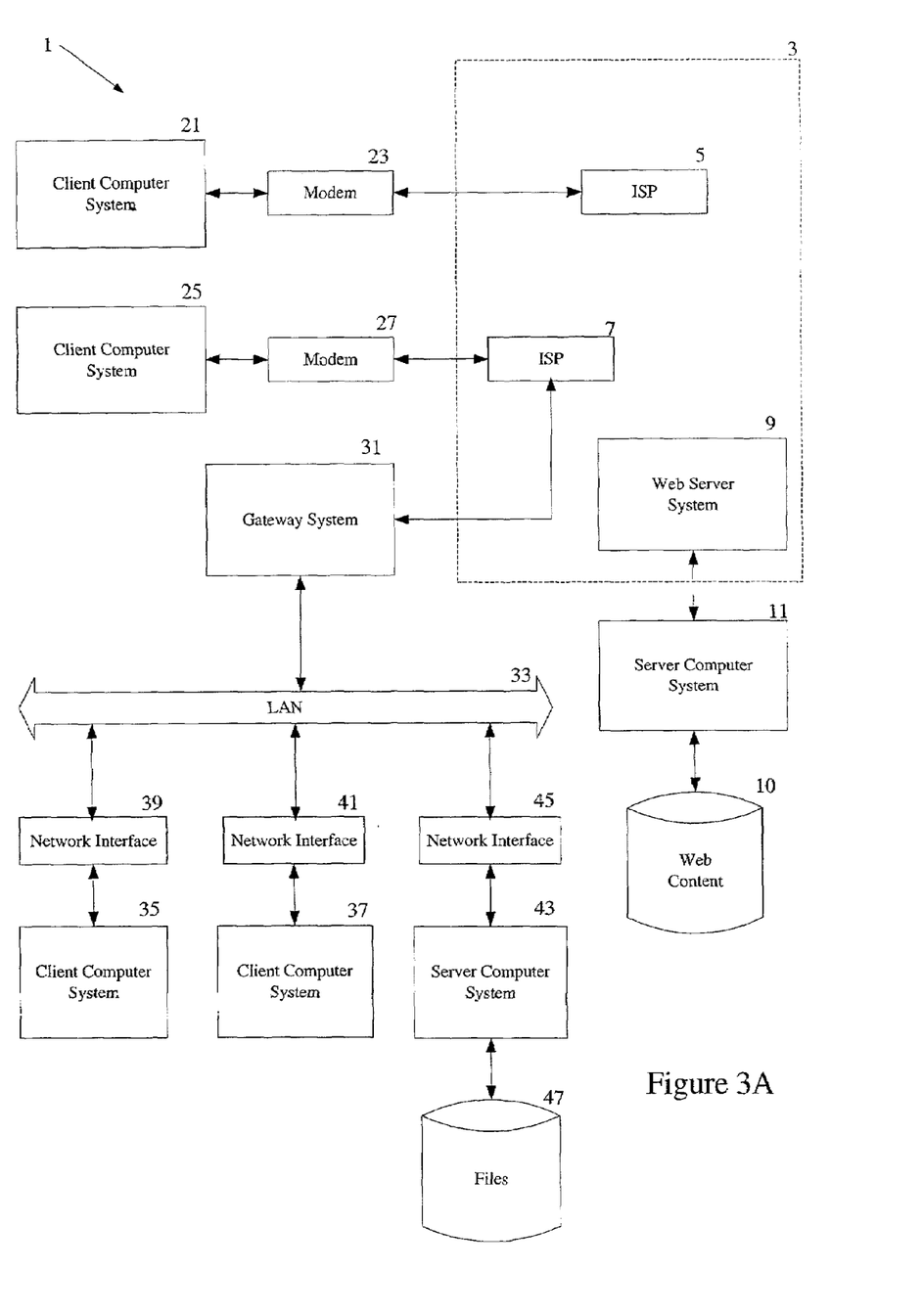
FIG. 3A is a diagram of one embodiment of an operating environment suitable for practicing the present invention.
Figure 3B:
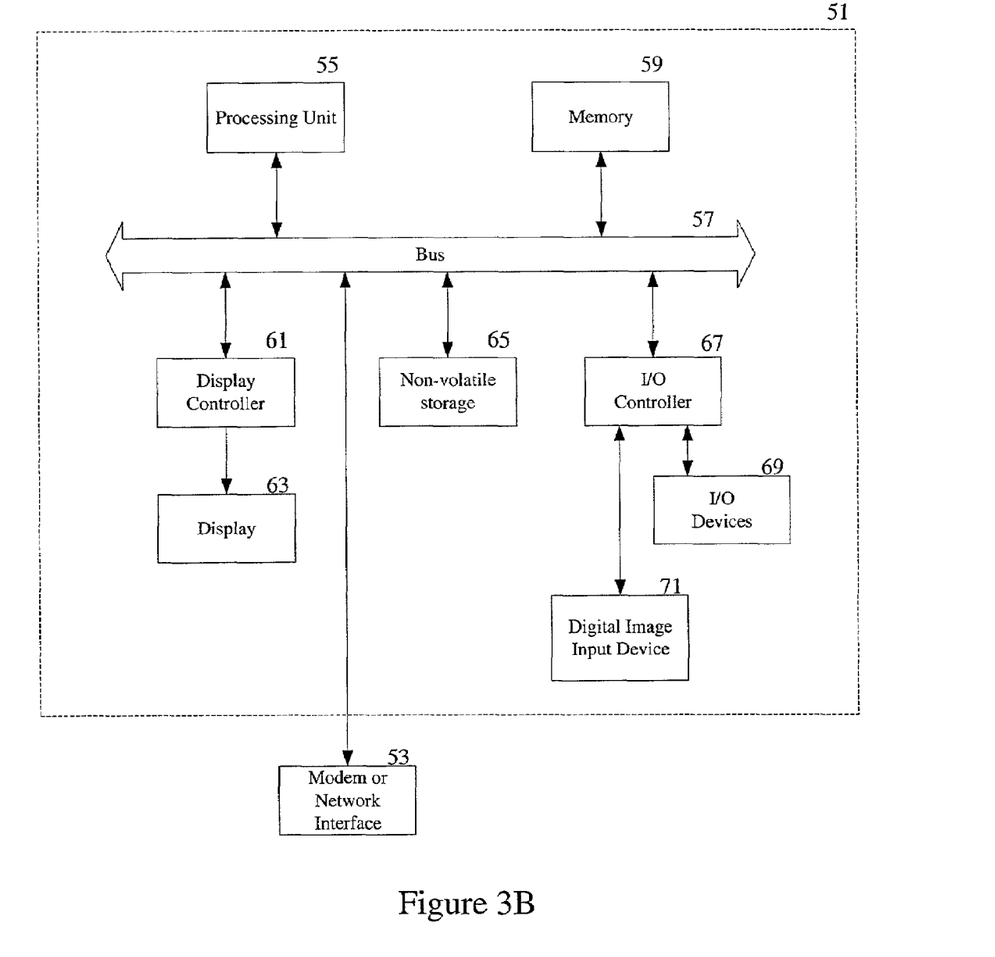
FIG. 3B is a diagram of one embodiment of a computer system suitable for use in the operating environment of FIG. 3A.

The following description of FIGS. 3A–B is intended to provide an overview of computer hardware and other operating components in which the invention may be practiced, but is not intended to limit the applicable environments. One of skill in the art will immediately appreciate that the invention can be practiced with other computer system configurations, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network having a physical or wireless infrastructure, or a combination of both.

FIG. 3A shows several computer systems that are coupled together through a network 3, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art. Access to the Internet 3 is typically provided by Internet service providers (ISP), such as the ISPs 5 and 7. Users on client systems, such as client computer systems 21, 25, 35, and 37 obtain access to the Internet through the Internet service providers, such as ISPs 5 and 7, through either physical or wireless interfaces. Access to the Internet allows users of the client computer systems to exchange information, receive and send e-mails, and view documents, such as documents which have been prepared in the HTML format. These documents are often provided by web servers, such as web server 9 which is considered to be "on" the Internet. Often these web servers are provided by the ISPs, such as ISP 5, although a computer system can be set up and connected to the Internet without that system being also an ISP as is well known in the art.

The web server 9 is typically at least one computer system which operates as a server computer system and is configured to operate with the protocols of the World Wide Web and is coupled to the Internet. Optionally, the web server 9 can be part of an ISP which provides access to the Internet for client systems. The web server 9 is shown coupled to the server computer system 11 which itself is coupled to web content 10, which can be considered a form of a media database. It will be appreciated that while two computer systems 9 and 11 are shown in FIG. 4A, the web server system 9 and the server computer system 11 can be one computer system having different software components providing the web server functionality and the server functionality provided by the server computer system 11 which will be described further below.

Client computer systems 21, 25, 35, and 37 can each, with the appropriate web browsing software, view HTML pages provided by the web server 9. The ISP 5 provides Internet connectivity to the client computer system 21 through the modem interface 23 which can be considered part of the client computer system 21. The client computer system can be a personal computer system, a network computer, a Web TV system, a handheld wireless device, or other such computer system. Similarly, the ISP 7 provides Internet connectivity for client systems 25, 35, and 37, although as shown in FIG. 4A, the connections are not the same for these three computer systems. Client computer system 25 is coupled through a modem interface 27 while client computer systems 35 and 37 are part of a LAN. While FIG. 4A shows the interfaces 23 and 27 as generically as a "modem," it will be appreciated that each of these interfaces can be an analog modem, ISDN modem, cable modem, satellite transmission interface (e.g. "Direct PC"), radio frequency (RF), cellular, or other interfaces for coupling a computer system to other computer systems. Client computer systems 35 and 37 are coupled to a LAN 33 through network interfaces 39 and 41, which can be Ethernet network or other network interfaces. The LAN 33 is also coupled to a gateway computer system 31 which can provide firewall and other Internet related services for the local area network. This gateway computer system 31 is coupled to the ISP 7 to provide Internet connectivity to the client computer systems 35 and 37. The gateway computer system 31 can be a conventional server computer system. Also, the web server system 9 can be a conventional server computer system.

Alternatively, as well-known, a server computer system 43 can be directly coupled to the LAN 33 through a network interface 45 to provide files 47 and other services to the clients 35, 37, without the need to connect to the Internet through the gateway system 31.

FIG. 3B shows one example of a conventional computer system that can be used as a client computer system or a server computer system or as a web server system in conjunction with the present invention. It will also be appreciated that such a computer system can be used to perform many of the functions of an Internet service provider, such as ISP 5. The computer system 51 interfaces to external systems through the modem or network interface 53. It will be appreciated that the modem or network interface 53 can be considered to be part of the computer system 51. This interface 53 can be an analog modem, ISDN modem, cable modem, token ring interface, satellite transmission interface (e.g. "Direct PC"), radio frequency (RF), cellular, or other interfaces for coupling a computer system to other computer systems. The computer system 51 includes a processing unit 55, which can be a conventional microprocessor such as an Intel Pentium microprocessor or Motorola Power PC microprocessor. Memory 59 is coupled to the processor 55 by a bus 57. Memory 59 can be dynamic random access memory (DRAM) and can also include static RAM (SRAM). The bus 57 couples the processor 55 to the memory 59 and also to non-volatile storage 65 and to display controller 61 and to the input/output (I/O) controller 67. The display controller 61 controls in the conventional manner a display on a display device 63 which can be a cathode ray tube (CRT) or liquid crystal display. The input/output devices 69 can include a keyboard, disk drives, printers, a scanner, and other input and output devices, including a mouse or other pointing device. The display controller 61 and the I/O controller 67 can be implemented with conventional well known technology. A digital image input device 71 can be a digital camera which is coupled to an I/O controller 67 in order to allow images from the digital camera to be input into the computer system 51. The non-volatile storage 65 is often a magnetic hard disk, an optical disk, or another form of storage for large amounts of data. Some of this data is often written, by a direct memory access process, into memory 59 during execution of software in the computer system 51. One of skill in the art will immediately recognize that the term "machine-readable medium" includes any type of storage device that is accessible by the processor 55 and also encompasses a carrier wave that encodes a data signal.

It will be appreciated that the computer system 51 is one example of many possible computer systems which have different architectures. For example, personal computers based on an Intel microprocessor often have multiple buses, one of which can be an input/output (I/O) bus for the peripherals and one that directly connects the processor 55 and the memory 59 (often referred to as a memory bus). The buses are connected together through bridge components that perform any necessary translation due to differing bus protocols.

Network computers are another type of computer system that can be used with the present invention. Network computers do not usually include a hard disk or other mass storage, and the executable programs are loaded from a network connection into the memory 59 for execution by the processor 55. A Web TV system, which is known in the art, is also considered to be a computer system according to the present invention, but it may lack some of the features shown in FIG. 3B, such as certain input or output devices. A typical computer system will usually include at least a processor, memory, and a bus coupling the memory to the processor.

It will also be appreciated that the computer system 51 is controlled by operating system software which includes a file management system, such as a disk operating system, which is part of the operating system software. One example of an operating system software with its associated file management system software is the family of operating systems known as Windows® from Microsoft Corporation of Redmond, Wash., and their associated file management systems. The file management system is typically stored in the non-volatile storage 65 and causes the processor 55 to execute the various acts required by the operating system to input and output data and to store data in memory, including storing files on the non-volatile storage 65

The identification of matching channels within two optical fibers has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

For example, those of ordinary skill in the art will appreciate that while the invention as been described as operating with two physically separate optical fibers that each transport one direction of a full duplex conversation, the present invention is equally applicable to a single optical fiber that transports a full duplex conversation in both directions, and to environments in which more than two fibers carry multiple party conversations. Therefore, it is manifestly intended that this invention be limited only by the following claims and equivalents thereof.

What is claimed is:

1. A method comprising:
   determining a first set of suitable channels carrying optical signals in a first direction and a second set of suitable channels carrying optical signals in a second, opposite direction; and
   comparing the second set of suitable channels against a channel in the first set of suitable channels using matching criteria;
   wherein a network management device is utilized to obtain configuration parameters, and matching optical signals are outputted to the network management device.

2. The method of claim 1, wherein the determining comprises:
   analyzing signal characteristics of channels in the first and second directions.

3. The method of claim 2, wherein the determining further comprises:
selecting the channels in the first and second directions for analysis based on quality criteria.

4. The method of claim 2, wherein the determining further comprises:
detecting optical signals in the channels that represent a conversation of interest.

5. The method of claim 2, wherein the determining further comprises:
accessing an optical fiber carrying signals in the first and second directions; and
extracting the channels from the optical fiber.

6. The method of claim 2, wherein the determining further comprises:
accessing a first optical fiber carrying signals in the first direction and a second optical fiber carrying signals in the second direction; and
extracting the channels from the first and second optical fibers.

7. The method of claim 2, wherein the determining further comprises:
recording the signal characteristics of the channels in a data store.

8. The method of claim 2 further comprising:
outputting the signal characteristics of the channels.

9. The method of claim 1, wherein the matching criteria comprises:
a marker specific to a communications protocol layer.

10. The method of claim 1 further comprising:
detecting a match between the channel in the first set of suitable channels and one of the channels in the second set of suitable channels.

11. The method of claim 10 further comprising:
outputting the match.

12. The method of claim 1 further comprising:
repeating the comparing for another channel in the first set of suitable channels.

13. The method of claim 1 further comprising:
obtaining the matching criteria.

14. The method of claim 1 further comprising:
obtaining signal characteristics that define a suitable channel.

15. The method of claim 14, wherein the signal characteristics are selected from the group consisting of speed, protocol, and encoding.

16. A computer-readable medium having executable instructions to cause a processor to execute a method comprising:
determining a first set of suitable channels carrying optical signals in a first direction and a second set of suitable channels carrying optical signals in a second, opposite direction; and
comparing the second set of suitable channels against a channel in the first set of suitable channels using matching criteria; and
analyzing signal characteristics of channels in the first and second directions;
wherein a network management device is utilized to obtain configuration parameters, and matching optical signals are outputted to the network management device.

17. The computer-readable medium of claim 16 wherein the method further comprises:
analyzing signal characteristics of channels in the first and second directions to determine the first and second set of suitable channels.

18. The computer-readable medium of claim 17, wherein the method further comprises:
selecting the channels in the first and second directions for analysis based on quality criteria.

19. The computer-readable medium of claim 17, wherein the method further comprises:
detecting optical signals in the channels that represent a conversation of interest to determine the first and second set of suitable channels.

20. The computer-readable medium of claim 17, wherein the method further comprises:
recording the signal characteristics of the channels in a data store.

21. The computer-readable medium of claim 17, wherein the method further comprises:
outputting the signal characteristics of the channels.

22. The computer-readable medium of claim 16, wherein the method further comprises:
detecting a match between the channel in the first set of suitable channels and one of the channels in the second set of suitable channels.

23. The computer-readable medium of claim 22, wherein the method further comprises:
outputting the match.

24. The computer-readable medium of claim 16, wherein the method further comprises:
repeating the comparing for another channel in the first set of suitable channels.

25. The computer-readable medium of claim 16, wherein the method further comprises:
obtaining the matching criteria.

26. The computer-readable medium of claim 16, wherein the method further comprises:
obtaining signal characteristics that define a suitable channel.

27. An apparatus comprising:
a plurality of optical wavelength filters to extract channels from a plurality of optical fibers;
a plurality of optical signal analyzers coupled to the plurality of optical wavelength filters to analyze signal characteristics of optical signals in the channels and further coupled to a data store to record the signal characteristics in the data store; and
a matcher coupled to the data store to determine sets of suitable channels based on the signal characteristics and further coupled to the plurality of optical wavelength filters to detect matching optical signals in the sets using matching criteria;
wherein the matcher selectively couples to a network management device to obtain configuration parameters and to output the matching optical signals to the network management device.

28. The apparatus of claim 27 further comprising:
a plurality of optical taps coupled to the plurality of optical wavelength filters to provide access to the channels in the plurality of optical fibers.

29. A system comprising:
a processor for coupling to an optical network; and
an identification process executed by the processor to cause the processor to analyze signal characteristics of optical signals in channels in the optical network, to determine sets of suitable channels based on the signal characteristics, and to detect matching optical signals in the sets using matching criteria;
wherein a network management device is utilized to obtain configuration parameters, and the matching optical signals are outputted to the network management device.

* * * * *